Nov. 29, 1960  J. O. OLSEN ET AL  2,962,069
SLICING MACHINE

Filed Nov. 2, 1954  6 Sheets-Sheet 1

Fig. 1

Inventors
Joseph O. Olsen
Herbert H. Weber
By Hill, Sherman, Meroni, Gross & Simpson Attys Nov. 29, 1960     J. O. OLSEN ET AL     2,962,069
SLICING MACHINE Filed Nov. 2, 1954     6 Sheets-Sheet 3

Inventors
Joseph O. Olsen
Herbert H. Weber

Nov. 29, 1960  J. O. OLSEN ET AL  2,962,069
SLICING MACHINE
Filed Nov. 2, 1954  6 Sheets-Sheet 5

Inventors
Joseph O. Olsen
Herbert H. Weber

United States Patent Office 2,962,069
Patented Nov. 29, 1960

2,962,069
SLICING MACHINE

Joseph O. Olsen, Milwaukee, and Herbert H. Weber, Kiel, Wis., assignors to H. G. Weber & Company, Inc., Kiel, Wis., a corporation of Wisconsin Filed Nov. 2, 1954, Ser. No. 466,277

2 Claims. (Cl. 146—151)

The present invention relates generally to a slicing machine, and more particularly relates to a slicing machine for cutting frozen meat.

In a meat packing and processing industry there is generally a sizeable quantity of scrap meat remaining after the readily saleable cuts have been removed from the butchered animal. This scrap meat would represent substantial losses to the industry if profitable disposition of the same could not be had.

Therefore, it has become general practice to deposit the scraps in sizeable containers and store the same until a commercial quantity has been gathered. Usually, it is necessary to store these scraps for a longer period than the period during which they could safely be stored at room temperature. To safeguard against decay or other contamination the filled containers are placed in cold storage and the scraps therein freeze. During the freezing process the scraps freeze together and when the containers are removed from cold storage the scraps therein contained are so frozen together that they may be removed from the container as one solid piece having substantially the same size and shape as the container.

A large proportion of this scrap meat is found to have its greatest commercial value as ground meat. The size and bulk of the frozen scrap piece removed from the container is, however, too large to grind in that form. That is, the bulk removed from the container is too large to readily fit into grinding machines.

It, therefore, becomes necessary to reduce in some way the size of the frozen quantity removed from the storage container.

Although many systems and machines have been employed for this purpose they have generally been found to be too large and space consuming, too expensive or too difficult or unsafe to operate, to be of real practical value to the meat packing and processing industry.

It is, therefore, an important object of the present invention to provide a small, inexpensive and convenient slicing machine.

It is another important object of the present invention to provide an inexpensive, self-contained, substantially portable slicing machine.

It is still another object of the present invention to provide an hydraulically operated and gravity feed slicing machine.

Yet another object of the present invention is to provide a slicing machine which is adjustable in cutting stroke length and which is adjustable in slice thickness.

It is a further object of the instant invention to provide an adjustable supporting assembly which is reversible for varying the relative height of the support members.

It is a still further object of this invention to provide a slicing machine with a reciprocating blade and means to open the machine and return the blade to its starting or open position automatically.

It is still a further object of the present invention to provide coordinated supporting and slicing mechanism disposed for simultaneous movement and arranged to cooperatively support the article to be sliced during the slicing operation.

Another object of the present invention is to provide an hydraulic double acting drive mechanism and system of adjustably controllable stroke length and incorporating a flow valve mechanism.

It is a further object of the present invention to provide a slicing machine with the features hereinabove defined.

Still other and further objects and features of the present invention will become apparent from the following detailed description of the present invention and a preferred embodiment thereof, from the claims and from the accompanying drawings, in which each and every detail shown is fully disclosed a part of this specification, in which like reference numerals refer to like parts and in which:

Figure 1:
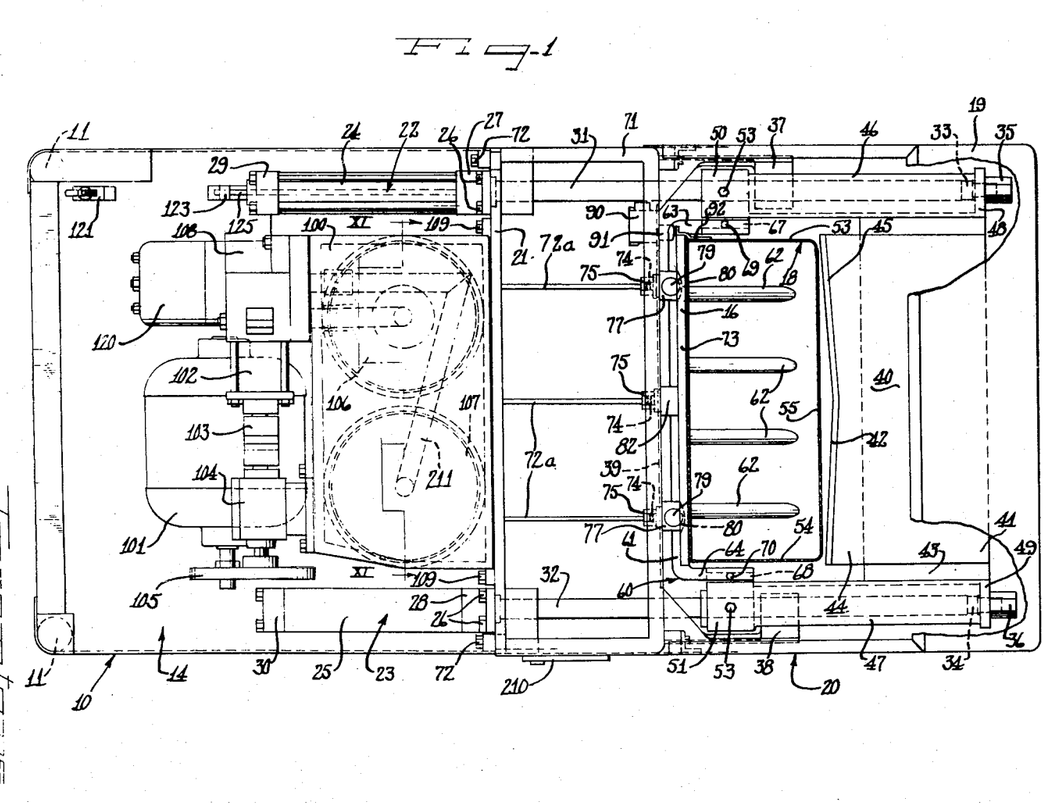
Figure 1 is a top plan view of a preferred embodiment of a slicing machine incorporating the features of the present invention, with part of the outer housing broken away to better illustrate a number of the structural features of the machine.
Figure 2:
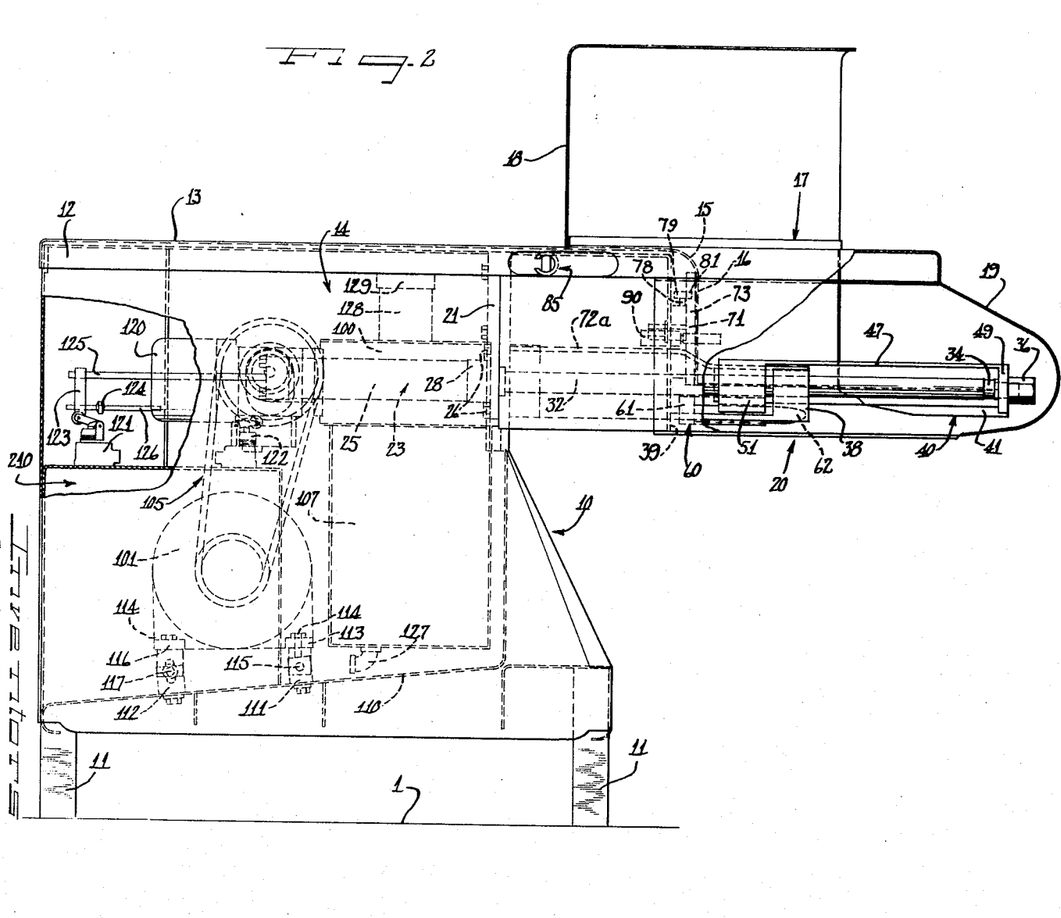
Figure 2 is a side elevational view of the machine illustrated in Figure 1, with a portion of the outer housing broken away.

In the embodiment of the present invention shown in the drawings, and with particular reference to Figures 1 and 2, there is illustrated an automatic self-contained slicing machine, the working and moving parts of which are enclosed by a housing 10. The housing 10 encloses the self-contained machine and internally supports the several hereinafter described parts and is itself supported from the floor line 1 by legs 11. A working and feed table 12 having a flat smooth, clean upper surface 13 covers a major portion of the housing 10. The working surface 13 of the cover 12 is continuous over the entire rear portion or working and control section 14 of the machine and housing 10, but is turned downwardly as at 15 in a smooth bend of a substantial radius to provide a cover facing 16 as a back wall to the opening at the cutting section of the machine. The opening indicated generally at 17 is provided in the top of the housing 10 above the article-supporting and cutting section 20 of the machine to facilitate easy depositing of frozen meat or other article to be sliced into the machine for slicing. A hopper 18 is detachably secured to the cover 12 of the housing 10 and a knife cover 19 and surrounds the opening 17 and opens to the rear of the machine and extends rearwardly beyond the bend 15 in the top surface 13 of the cover 12. The hopper 18 is also open at the top thereof to facilitate handling of frozen meat or other articles taller than the hopper itself.

At the forward end of the control and driving section 14 of the machine, the housing 10 carries a securing wall 21 to which the knife cover section 19 is removably secured.

The securing wall 21 extends laterally across substantially the entire width of the housing 10 and carries a pair of piston-cylinder assemblies 22, 23 which are secured to the securing wall 21 in such a manner that the cylinders 24, 25 are positioned at opposite lateral extremities of the wall 21, parallel to each other, and lie in a common plane substantially parallel to the upper surface 13 of the cover 12. The assemblies 22, 23 may be secured to the securing wall 21 by any convenient means such as bolts 26 or the like. The rod ends 27, 28 of the piston-cylinder assemblies 22, 23, respectively, are secured to the securing plate 21 with the cap ends 29, 30 of each assembly, respectively, extended rearwardly from the securing plate 21. Both of the piston-cylinder assemblies 22, 23 are preferably of the double acting type whereby the pistons may be driven in either direction.

Piston rods 31, 32 extend forwardly through the securing wall 21 from the piston-cylinder assemblies 22, 23, respectively, for a considerable length to a point near the forwardmost end of the knife cover 19. The piston rods 31, 32 are about the same length and terminate in machined shoulder portions 33, 34, the forwardmost ends of which are preferably threaded to carry knife support securing nuts 35, 36.

The knife unit 40, in addition to being driven by the piston-cylinder assemblies 22, 23, is entirely supported and carried by the piston rods 31, 32. To avoid deformation of the piston rods 31, 32 because of their length and the weight supported at the ends thereof, supporting bearing members 37, 38 are secured to a bracer plate 39 and reinforcing frame 71 which will be further described hereinafter in conjunction with the article-supporting system. The support bearing units 37, 38 are positioned about midway along the length of the piston rods 31, 32 from the rod ends 27, 28 of the cylinders 24, 25 when the rods are fully extended. This spacing is not critical except that the support bearings 37, 38 should be so positioned so as not to interfere with the operation of the machine; particularly, so as not to interfere with the knife unit 40 and the article-supporting system while the same are stroked forwardly and rearwardly during operation of the machine as hereinafter described.

With further reference to Figures 1 and 2 and additional reference to the diagrammatic representations in Figures 7 through 10, the knife unit 40 includes a broad slicing blade 41 which is preferably slightly V-shaped and has a slightly V-shaped edge 42 with the apex of the V disposed at the lateral center of the blade and with the divergent arms of the V extending slightly in the direction of cutting for a more efficient slicing operation. The blade 41 is preferably one of multiple parts construction (note Figures 7 and 9) having a main blade body 43 carrying a blade face 44 which has a cutting edge insert 45 along the cutting edge 42 thereof. In the embodiment of the present invention illustrated in the drawings, the blade face 44 and the main blade body 43 are so constructed that the blade 41 has an essentially flat smooth upper face and a leading edge contoured to deflect the slice taken from the article to be sliced downwardly (see Figures 7 and 9).

The main blade body 43 extends laterally beyond the blade face 44 at each side thereof (note in particular Figure 1) and at each of its lateral sides is secured to knife and article supporting bars 46, 47. The knife and article support carrying bars 46, 47 are comprised of a main body spacer section of angle iron configuration opening outwardly and downwardly and terminating at their forward ends in securing plates 48, 49. At their rearward ends the bars 46, 47 terminate in securing eye brackets 50, 51. The eye brackets 50, 51 are substantially hook-shaped (note Figures 8 and 10) and together with tight fitting inserts, such as insert 52 of Figures 8 and 10, securely grip the piston rods 31, 32. In addition, further securing means such as set screws 53 may be provided in the securing eye brackets 50, 51 to securely fasten the same to the piston rods 31, 32.

At the forward ends of the carrying bars 46, 47 the securing plates are secured to the piston rods 31, 32 by fixing the same against shoulders provided at the machined shoulder portions 33, 34 of the piston rods 31, 32 by threading knife support securing nuts 35, 36 onto the threaded ends of the piston rods 31, 32. With the carrying bars 46, 47 fixed in placed as immediately above described, the knife unit 40 is securely carried on and drivingly supported by the piston rods 31, 32 and the same are properly relatively positioned for movement together since the main blade body 43 is secured to the carrying bars 46, 47 in any convenient manner such as by welding or the like. It may be noted that in the embodiment of the present invention illustrated in the drawings the support bearings 37, 38 are positioned under the angle iron shaped portions of the carrying bars 46, 47 and between the above described terminating ends thereof. When so positioned, the supporting bearings 37, 38 may be employed to provide safety stop means for the blade should there be a failure of the other systems provided for that purpose as hereinafter described.

The article or meat-supporting unit 60 is also carried by and secured to the carrying bars 46, 47 for movement therewith and with the piston rods 31, 32. A substantially U-shaped frame bar 61 has secured thereto meat-supporting members such as the fingers 62. These meat-supporting members 62 are secured to the bight of the U-shaped supporting frame bar 61 in a common plane with each other and extending in a generally forward direction, the same direction as the arms 63, 64 at the ends of the bar 61.

Figures 7, 8:
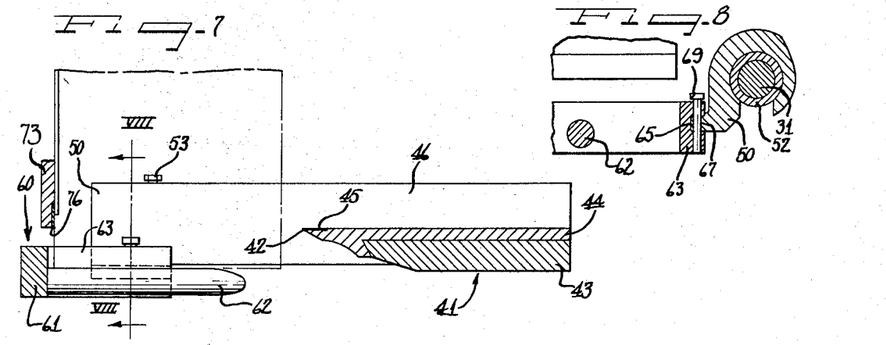
Figure 7 illustrates the knife and article support arrangement adjusted for thick slicing with the article to be sliced outlined in a broken line.
Figure 8 is a partial sectional view taken substantially along the line VIII—VIII of Figure 7.
Figures 9, 10:
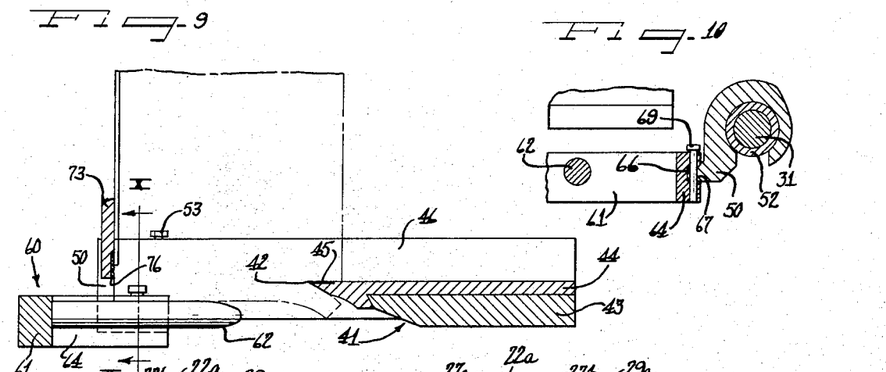
Figure 9 is essentially the same as Figure 7 except that the supporting unit is adjusted for thin slicing.
Figure 10 is a partial sectional view essentially the same as Figure 8 except that it is taken substantially along the line X—X of Figure 9.

In Figures 8 and 10 it may be seen that grooves 65, 66 are provided in the outwardly facing lateral surfaces of the arms 63, 64 along about midheight therein. Lugs 67, 68, on the lower inwardly facing extremity of the securing eye brackets 50, 51, have substantially the same dimensions as the grooves 65, 66. The lugs 67, 68 and the grooves 65, 66 are all of substantially the same size and configuration, thereby permitting reversal of the frame bar 61. That is, by having the lugs and grooves all of substantially the same size and dimension the supporting frame bar 61 may be reversed at will and the arm 64 may be supported by either the eye bracket 50 or the eye bracket 51 and the arm 63 may correspondingly be supported by the eye bracket 51 or the eye bracket 50. Any convenient securing means such as pins 69, 70 may be employed to secure the article or meat-supporting unit to the eye brackets and against movement with respect to the carrying bars, and therefore against movement with respect to the knife unit 40.

The reversibility of the meat-supporting unit 60 is an important feature of the present invention in that it permits convenient adjustment of the size of the slice to be taken. The supporting fingers 62, are as stated, disposed in a common plane. That plane, however, is not the plane of the centerline of the supporting frame 61, but is parallel thereto and displaced therefrom. The plane of the fingers 62 may, however, be the centerline plane if the grooves 65, 66 are displaced from the centerline plane. The important feature is the plane of the supporting members or fingers 62 being displaced from the plane of the grooves 65, 66. With such a construction, reversal of the supporting unit 60 will serve to raise or lower the fingers 62 with respect to the cutting edge 42 on the knife unit 40. This construction and adjustment feature can be most readily observed by a comparison of Figures 7 and 8 with Figures 9 and 10.

In Figures 7 and 8, the supporting fingers 62 are disposed below the plane of the grooves 65, 66 whereas in Figures 9 and 10 the supporting unit 60 has been reversed and the supporting members or fingers 62 are disposed above the plane of the grooves 65 and 66. With the arrangement as shown in Figure 7, thick slices will be taken from the frozen meat or other article as shown by the broken line and with the arrangement as shown in Figure 9, thin slices will be taken from the frozen meat.

The aforementioned bracer plate 39 is a substantially rectangular plate positioned slightly rearwardly of the turned down facing portion 16 of the table top 13 of the cover 12 and is carried by the reinforced frame 71 which is securely fastened to the securing wall 21 by any convenient means such as, for example, the bolt 72, and extends forwardly of the securing wall 21.

In addition to the supporting quality of the reinforced frame 71, reinforcing and bracing rods 72a extend between the securing wall 21 and the bracer plate 39 to brace the plate 39 against any bearing forces exerted thereagainst.

A dead knife or shear plate is adjustably secured to the bracer plate 39 and lies immediately against the rearward face of the turned down facing portion 16 on the table top 13. Slots are provided in the bracer plate 39 to provide an opening therethrough for such convenient securing means as studs secured to the shear plate or dead knife 73, or machine screws to be threaded into the backside of the dead knife 73. In the present embodiment of the invention studs have been found to be preferable and these are affixed to the dead knife 73 to extend rearwardly through the slots in the bracer plate 39 at laterally spaced intervals so that nuts 75 threaded onto the studs 74 will securely fasten the dead knife or shear plate 73 in its preselected position. Since the position of the lower edge, the cutting edge, 76 of the shear plate 73 with respect to the cutting edge 42 of the live knife slicing unit 40 is important for an efficient slicing operation, there is provided adjusting means to interconnect the dead knife 73 and the bracer plate 39. Small, bored, internally threaded blocks 77 are secured, as by welding to the forward face of the bracer plate 39 above each of the two lateralmost slots for studs 74. Each of these two blocks 77 is provided with a threaded hole running generally vertically therein to receive a machine screw having a relatively large diameter cylindrical head 79. Grooves 80 are provided in the face of the dead knife plate 73 to receive the head 79 of the machine screws 78 and are provided with at least an upper shoulder face 81 to rest on the top surface of the screw head 79.

With the nut 75 slightly loosened, manipulation of the screws 78 will raise or lower the dead knife plate 73 to its preferably selected position with respect to the cutting edge 42 of the life knife 40 and thereafter the dead knife may be securely fixed in that preselected position by tightening of the nut 75 on the stud 74.

The blocks 77, in conjunction with a block 82 secured to the forward face of the bracer plate 39 above the center slot therein and having the same dimensions as the pair of blocks 77, provide convenient and accurate spacing means between the bracer plate 39 and the shear plate or dead knife 73. It should be understood, of course, that the precise positions and number of these blocks and the adjusting devices are not critical.

A safety interlock switch 90, which when open will stop the operation of the slicing machine in a manner hereinafter described, is secured in its proper position on the backing and bracer plate 39 at the rearward side thereof with the actuating button 91 of the switch 90 extending through an appropriate opening in the plate 39. The button 91 is pressed inwardly to maintain the switch closed by an interlock arm 92 secured to the hopper 18.

The hopper 18, generally described above, has a pair of lateral side walls, 53, 54 and a forward wall 55 which extend down into the opening 17 to a level immediate above the plane of movement of the cutting edge 42 of the live knife unit 40. The interlock arm 92 is carried on the outer side of the wall 53 of the hopper 18 in the embodiment of the present invention illustrated in the drawings. It should be understood, of course, that the precise placement of the switch 90 and the arm 92 is not critical to the positions described therefor immediately above, but may be positioned anywhere found convenient just so long as the interlock switch 90 may be closed when the hopper 18 is in its proper position and opened whenever the hopper 18 is removed or out of position.

In the working control section 14 of the slicing machine of the instant invention, and rearwardly of the securing wall 21 there is contained within the housing 10 a complete control and operating unit for the machine and particularly the hydraulic system of the instant invention.

The hydraulic system, driving system and control system include an adjustably mounted motor 101 which drives a pump 102 through a coupling unit 103 and a countershaft arrangement 104 which is coupled to the motor through a belt and pulley arrangement 105.

In order to maintain the belt of the belt and pulley arrangement 105 in proper driving continuity, the motor 101 is adjustably supported on a housing floor plate 110 which carries mounting brackets 111, 112. The forward legs 113 are hingedly secured to the brackets 111 by leg bolts 114 and hinge pins 115. The rearward legs 116 are similarly secured to the mounting brackets 112 by leg bolts 114. The rearward mounting brackets 112 differ from the mounting brackets 11, however, in that adjusting bolts 117 are provided to adjustably determine the height of the rearward mounting brackets; parts of the rearward mounting brackets having slots therein to provide for vertical movement thereof with the adjusting bolts 117 extending through the slots.

Before undertaking any consideration of the detailed description of the tank structure and the reversible double acting valve assembly 108 which is actuated and controlled by a system including the solenoid 120, limit switches 121, 122, fixed trip dog 123, adjustable trip dog 124 and the trip dog rod 125, the flow pattern and operational cycle of the hydraulic system generally should be understood. Therefore, specific reference is now made to the schematic representation of the hydraulic system illustrated in Figures 5 and 6.

Figure 5:
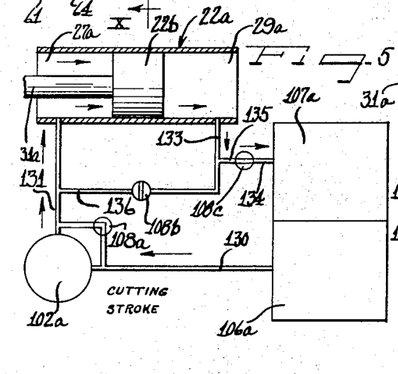
Figure 5 is a diagrammatic representation of the hydraulic system of the present invention showing the fluid flow paths and directions during the cutting stroke.

Figure 5 diagrammatically illustrates the hydraulic system and flow pattern during the power stroke which is the cutting or slicing stroke or driving stroke of the slicing machine. It should be understood that in the actual system and in the embodiments of the present invention illustrated in Figures 1 and 2, that the two double acting hydraulic piston-cylinder assemblies are connected in parallel and that, therefore, only one need be shown in the diagrammatic representations in Figures 5 and 6. Also, it should be understood that the several valves described in Figures 5 and 6 are incorporated into the single reversible double acting valve assembly described hereinbelow and illustrated in detail in Figures 3 and 4.

During the power stroke, fluid is drawn from the tank 106a through the line 130 to the pump 102a which is provided with an overpressure by-pass valve 108a. With the valve 108c open and with the valve 108b closed, the hydraulic fluid is forced from the pump 102a through the line 131 to the rod end 27a of the double acting piston-cylinder assembly 22a to drive the piston 22b and the piston rod 31a in the direction of the cap end 29a. At the same time fluid is forced out of the cap end 29a through the line 133 to the open valve 108c and therethrough and through the line 134 to the tank 107a. The line 133 which extends directly to the valve 108b is connected to the valve 108c by the line 135. Since the valve 108b is closed no fluid passes through the portion of the line 133 between the connection of the line 135 and the connection with the valve 108b, and no fluid passes through the line 136 interconnecting the line 131 with the valve 108b.

With the tanks 106a and 107a the fluid is received by the tank 107a and may be filtered and returned to the tank 106a or it may be simply returned directly to the tank 106a.

Figure 6:
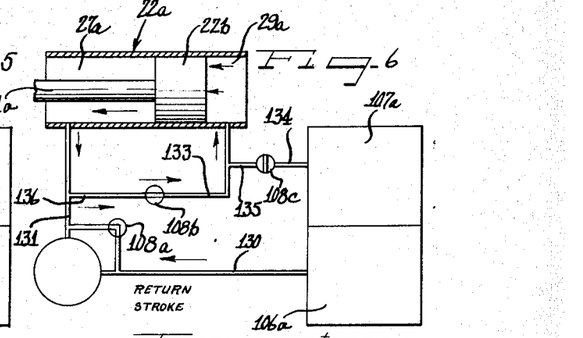
Figure 6 is identical to Figure 5 except that it shows the fluid flow paths and directions during the return stroke.

At the conclusion of the power, cutting or slicing stroke, the automatically actuated valves are moved to their return stroke position as diagrammatically illustrated in Figure 6. During the return stroke, fluid is forced into the cap end 29a from two sources. One source includes fluid which is drawn from the tank 106a, through the line 130, through the pump 102a, through the lines 131 and 136, consecutively, through the now open valve 108b and through the line 133 to the cap end 29a. No fluid passes from the line 133 through the line 135, the valve 108c and the line 134 to the tank 107a since the now closed valve 108c does not permit such fluid flow. The other source of fluid forced into the cap end 29a includes fluid from the rod end 27a of the double acting piston-cylinder assembly 22a, through the lines 131 and 136 to the valve 108b, through the now open valve 108b and through the line 133 to the cap end 29a.

The combined effect of these two hydraulic fluid sources force the piston 22b and the piston rod 31a in the direction of the rod 27a of the double acting piston-cylinder assembly 22a for accomplishment of the return stroke of the system.

It should be noted here that during the return stroke no fluid is returned to the tank 107a.

Figures 3, 4:
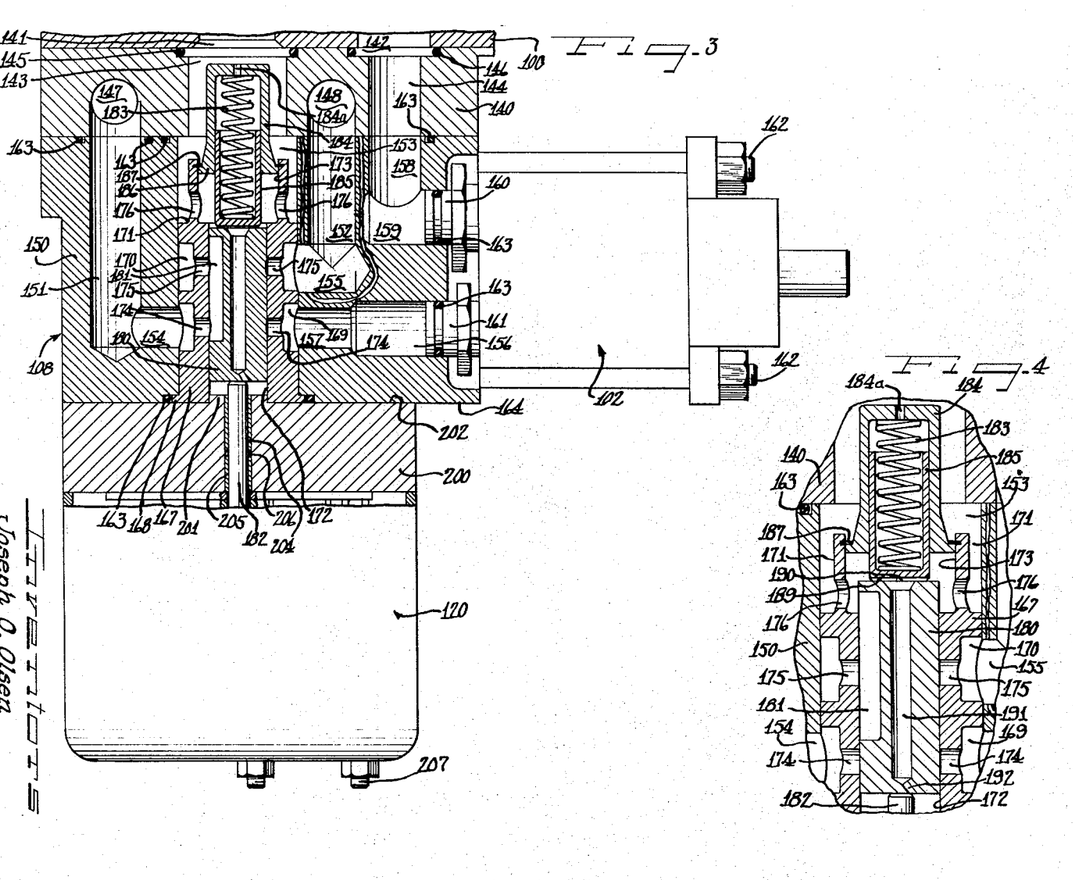
Figure 3 illustrates a preferred embodiment of the valve, solenoid and pump assembly of the present invention, illustrating the same in a top plan view with the valve assembly in full section and showing the valve spool in its return stroke position.
Figure 4 illustrates a valve spool and valve sleeve assembly of Figure 3 with the valve spool in its raised, cutting stroke, actuated position.

With the foregoing principles of operation of the hydraulic system well in mind the specific valve structure of the present invention may be most easily understood by specific reference to Figures 3 and 4. In Figure 3 the valve assembly 108, the pump 102 and the solenoid 120 and the relief valve are oriented and fixed together precisely as shown in Figure 1. The valve assembly 108 and the solenoid 120 are shown in their de-actuated, de-energized, return stroke position.

A manifold mounting plate 140 is secured against the rearward face of the tank head and frame 100 adjacent to the tank 106. Fluid passages 141, 142 are provided through the head and frame unit 100 and are properly positioned to correspond and mate with fluid passages 143, 144 in the manifold mounting plate 140. The passage 141, mated with the passage 143, lead to the return tank 107 and the passage 142, mated with the passage 144, leads from the hydraulic fluid supply tank 106. At the interface between the manifold mounting plate 140 and the head and frame unit 100 the passages 143, 144 are enlarged to accommodate packing O rings 145, 146 to avoid fluid leakage.

An aperture or fluid flow passage 147 runs through the manifold mounting plate 140 from a passage 151 in the manifold block 150 to the rod ends 27, 28 of cylinders 24, 25, respectively. Another aperture or fluid flow passage 148 in the manifold mounting plate 140 leads from the cap ends 29, 30 of cylinders 24, 25 to a passage 152 in manifold block 150. The passages 147, 148 each take a right angle turn within the plate 140 so that each may extend through both a side of the plate and through the rearward face of the plate. A smooth, uniform relatively large bore 153 passes entirely through the manifold block 150, approximately centrally thereof and connects with the passage 143 in the mounting plate 140. The walls of the bore 153 have apertures therein where the passage 151 communicates therewith through a passage 154, where the passage 152 communicates therewith through the passage 155 and where the pump outlet passage 156, the inlet passage for the fluid into the valve system from the pump, communicates with the bore 153 through the reduced passage 157.

The passage 151 extends a greater portion of the distance through the manifold block 150 almost to the rearward face thereof and communicates with the passage 154 at right angles while the passage 152 extends only about halfway through the manifold block 150 and communicates with the passage 155 also at right angles. A passage 158 in the manifold block 150, communicating with the passage 144 in the manifold mounting plate 140, extends for a short distance into the manifold block 150 where it communicates with a passage 159 which leads out the side of the manifold block 150 to the inlet side of the pump 102. The pump inlet and outlet tubes 160, 161, respectively, are secured in the passages 159 and 156, respectively, and the pump 102 is secured to the manifold block 150 by any convenient means such as studs and nuts 162. Packing O rings 163 are provided about all of the openings in the outer faces of the manifold block 150 to prevent hydraulic fluid leakage.

A valve sleeve 167 is fitted, as by a slip fit, into the bore 153 of the manifold block 150 from the rearward face 164 of the block 150. The sleeve 167 is substantially cylindrical and provided with a shoulder portion 168 which lies in a shoulder groove 165 at the rearward face 164 of the block 150 and about the bore 153 therein. The sleeve 167, thus accurately and securely positioned within the bore 153, is peripherally grooved as at groove 169 to communicate the passage 154 with the passage 157. Another peripheral groove 170 in the sleeve 167 communicates with the passage 155. At the forward end of the sleeve 167 its outside diameter is reduced, as at 171, to provide for the passage of fluid about the forward end of the sleeve 167 and passes the same out from the passage 153 through the passage 143 and the passage 141 to the return tank.

The sleeve 167 is centrally bored as at 172, the bore being enlarged in the region of the reduced outside diameter section 171 of the sleeve 167. The enlarged bore section is indicated at 173. Ports or orifices 174, 175, 176, respectively, which may be in pairs or otherwise as desired, are provided at spaced intervals along the sleeve 167 and thereabout to communicate the grooves or channels 169, 170, 171 with the bores 172, 173 in the sleeve 167. Thus, the passages 154 and 157 are communicated with each other through the channel or groove 169 and further are communicated with the bore 172 in the sleeve 167 through the ports 174. Also, the passage 155, which is communicated with the channel or groove 170, communicates with the interior of the valve sleeve 167 through the port or orifice 175. Also, the passage 153 as it communicates with the passages 141 and 143 communicates with the interior of the valve sleeve 167, that is, with the bore 173, through the channel 171 and the ports or orifices 176.

A valve spool 180 having a length slightly less than the length of the bore 172 in the sleeve 167 is closely slidably fitted into the bore 172 in the valve sleeve 167 for reciprocation therein. The valve spool 180 is centered by fins and provided with longitudinal grooves or channels in the side thereof substantially less than the full length of the spool 180 and terminated in advance of communication with either end of the spool. The channels or grooves 181 in the side of the spool 180 are of such a length that when the spool is in its lowered position as shown in Figure 3, the port, or set of ports 175, is communicated with the port, or set of ports 174, for fluid flow through the channel 181; and when the spool is in its raised position as shown in Figure 4, the channel 181 communicates the port, or ports 176, with the port, or ports 175. When the spool is in its lowered position, which position is the deactivated and de-energized position, the bore 173, and therefore the ports 176 and the channels and passages 171, 153, 143 and 141 are blocked from any communication or fluid flow with the remainder of the system. When the spool is in its raised position, the ports 174 are blocked and therefore permits no fluid flow from the passages 154 and 157 and from channel 159 to the ports 175. In no position of the spool 180 is fluid permitted passage from the ports 176 to the ports 174.

Energization or activation of the solenoid 120 forces the solenoid rod 182 forwardly and, therefore, forces the valve spool 180 upwardly to the position therefor seen in Figure 4. This compresses the spring 183 which is held between and internally of the telescoping retainer members 184, 185, respectively. The inner retainer member 185 rests against the forward end of the valve spool 180 and slides in and out of the outer retainer member 184 which is retained in its proper position within the passages 153 and 143 by a shoulder portion 186 which is forced against a retaining spring ring 187 fitted into a groove in the bore 173 of the valve sleeve 167 near the forwardmost end thereof. The spring 183 is at all times under compression and, therefore, at all times presses the shoulder portion 186 fitted into the bore 173 against the retaining spring ring 187.

This spring cap assembly is operative as a dash pot and controls the speed of movement of the spool 180 by limiting fluid flow rate through the port 184a in the cap 184.

Upon de-actuation or de-energization of the solenoid 120, the solenoid rod 182 is permitted to return to its position as seen in Figure 3 and the spring 182 forces the valve spool 180 rearwardly to the position seen therefor seen in Figure 3.

A fluid leakage path is provided through the spool 180 by an axial bore 191 and a small drill hole 192 to release any fluid rearwardly of the spool 180.

The solenoid 120 is encased in a housing, and supported therein; the housing is carried by a solenoid mounting plate 200 which is mounted against the rearward face of the manifold block 150 and against the rearward face of the shoulder portion 168 of the valve sleeve 167. A slight extension 201 on the forward face 202 of the solenoid mounting block 200 is provided to seat within the bore 172 of the valve sleeve 167 and properly positions the solenoid 120 and the solenoid mounting block 200. A hole is provided through the solenoid mounting block 200 to accommodate the push rod 182. This hole 203 carries bushings 204, 205 to provide a relatively tight fit against the push rod, but allowing reciprocation of the rod 182 by the force of the solenoid 120 or the spring 183. In addition, an O ring 206 is fitted around the push rod 182 between the bushings 204 and 205 to prevent fluid leakage into the solenoid and solenoid housing. Such convenient securing means as studs and nuts 207 may be employed to secure the assembly together and to the tank head and frame unit 100.

The solenoid 120 is controlled, actuated and energized through adjustable closing and opening of limit switches 121, 122. A trip dog rod 125 is secured to the piston of the double acting piston-cylinder assembly 22 and extends through the cap end 29 of that assembly. At its rearward extremity the trip dog rod 125 carries a fixed trip dog 123 which extends downwardly from the rod a distance sufficient to engage the limit switch 121 at the end of the power stroke or cutting or slicing stroke. The trip dog 123 is so positioned on the rod 125 that it will engage the limit switch 121 immediately following the passage of the whole cutting edge 42 of the live knife assembly 40 under the bottom cutting edge 76 of the dead knife 73.

The trip dog 123 carries a forwardly extending adjustable dog arm 126 which in turn carries the adjustable trip dog 124 for engaging the limit switch 122 at the end of the return stroke of the slicing unit. Adjustment of the adjustable dog 124 along the rod 126 may be employed to adjust the stroke length for the live knife unit 40.

Tripping the limit switch 121 will de-energize the solenoid 120, thereby permitting return stroking, and at the end of the return stroke, tripping the limit switch 122 by the adjustable dog 124 will re-energize the solenoid to initiate the power stroke. During the entire period of the power stroke the solenoid will remain energized through a control system, not illustrated here, until the limit switch 121 is again tripped to de-energize the solenoid 120.

The operational cycle of the valve system 108 as it controls the flow of the hydraulic fluid in the system and as it is controlled by the solenoid 120 and the control system therefor is substantially the same as that described above in connection with Figures 5 and 6. At the start of the cycle the knife is in its cutting position, the position seen therefor in Figures 1 and 2, and the system is ready to be energized and actuated. Energization of the solenoid 120 pushes the valve spool forwardly against the spring 183 and closes the port 174 in the valve sleeve 167. Oil is then forced from the pump 102 through the passages 156 and 157, through the groove 169 and thereafter through the passages 154, 151 and 147 to the rod end of the cylinder. Hydraulic fluid from the cap end of the cylinder flows into the valve system through the passages 148, 152 and 155 to the channel 170 where it flows through the passages or ports 175, through the groove or channel 181 to the bore 173, out the port 176 to the channel 171 and the bore 153, the passages 143 and 141 to the return tank 107. At the same time oil is drawn from the supply tank 106 through the passages 142, 144, 158 and 159 through the inlet port 160 to the pump 102.

At the end of the cutting stroke the solenoid is de-energized and the spring 183 forces the valve spool 180 rearwardly to the position illustrated in Figure 3. In this position of the valve spool 180, the bore 153 and the port 176 are closed off from the remainder of the system and hence, no oil or other hydraulic fluid can flow to the return tank 107. In this position of the spool, however, the hydraulic fluid flows from the supply tank 106 through the passage 142, through the passage 144 in the manifold mounting plate 140, through the passages 158 and 159 in the manifold block 150 to the pump 102 through the inlet port therefor 160. The fluid then is forced from the pump 102 through the pump outlet port 161 through the passages 156 and 157 to the circumferential groove or channel 169 in the valve sleeve 167 and the port 174 to permit fluid flow therethrough, through the channel 181 in the spool 180, the port 175, the groove or channel 170 and the passages 155, 152 and 148 to the cap end of the cylinder to drive the same in a return stroke. During this return stroke the fluid also flows from the rod end of the cylinder to the passage 147 in the manifold mounting plate 140 and then to the passages 151 and 154 to the channel 169 where it joins fluid from the pump and flows therewith through the channel 181 and the valve spool 180, the port 175, the circumferential groove 170, the channels 155, 152 and 148 to the cap end of the cylinder.

From the foregoing it will be observed that the slicing machine is a fully automatic one for automatic reciprocation slicing of such objects as frozen quantities of meat and the like. In the operational cycle the blade and meat supporting unit will be automatically hydraulically reciprocated between the limits established by the described switches for energizing and de-energizing the solenoid of the valve assembly.

In addition to providing automatic reciprocation of the system, the mechanisms embodying the principles of the present invention are operative to return the live blade unit 41 to its retracted position at the forward end of the machine away from the dead knife assembly in the event of throwing of any of the safety switches about the machine or a power failure or some other mechanical break down since any of these events will result in de-energization of the solenoid and movement of the spool in the valve assembly to a position for returning the piston to the rod end of the cylinder and thereby returning the live knife unit 41 to the forward end of the machine. This automatic return of the live knife is an important safety factor since safety control switches as well as various door interlock switches and hopper interlock switches may be strategically placed to prevent injury to the operator of the machine. The fluid pressure available due to momentum of the motor will be sufficient to return the live knife units to the forward end of the machine even in such a case as a power failure.

The fluid supply system for the slicing machine of this invention forms an important part of this invention since it permits the mechanism to be assembled in a much smaller and much more light weight assembly than was heretofore possible. By constructing the tanks 106 and 107, note Figures 1 and 11, in accordance with the principles of the present invention they may have a size and capacity of about one half of the size and capacity normally considered necessary for tanks to supply a fluid system at the rate required by the hydraulic system of this machine. Normally high capacity tanks are considered necessary so as to maintain the fluid system stable and to reduce agitation and bubbling of the oil in the tanks. In accordance with the principles of the present invention, however, the fluid in the tanks will have a minimum of agitation and a minimum of bubbling since the fluid velocity at the inlet and outlet of the tanks is controlled.

Figure 11:
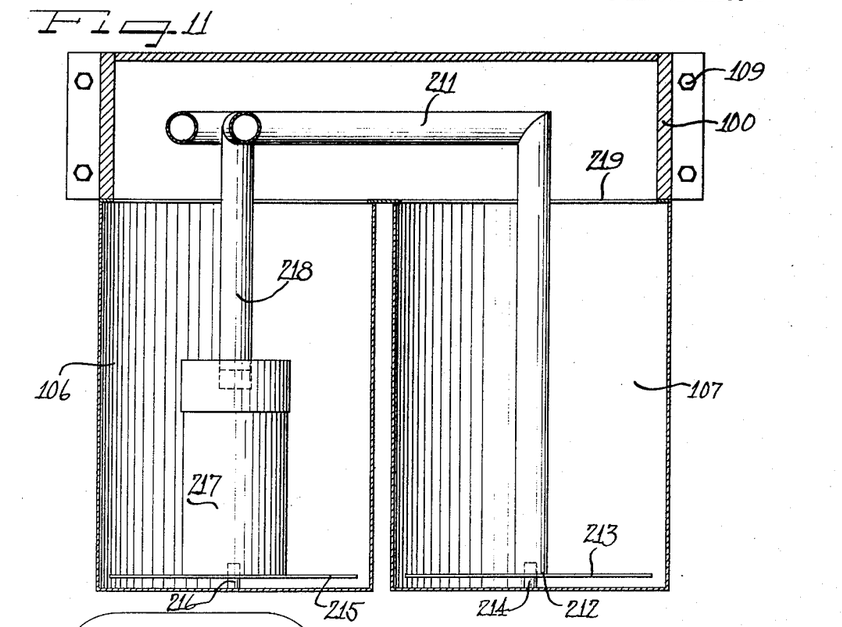
Figure 11 is a sectional view of the tank assembly taken substantially along the line XI—XI of Figure 1.

In the tank structures shown in Figures 1 and 11, the tanks 106 and 107 are supported from the tank head and frame 100 which also carries the valve and pump assembly.

It will be recalled that during the cutting stroke, fluid is pumped through the passage 141 (Figure 3) to the return tank 107 from the cap end of the piston-cylinder assemblies. The fluid flow path into the return tank 107 includes a fluid tube 211 which is in fluid communication with the passage 141 and which extends through the head 100 to a termination point 212 near the bottom of the tank 107 and there within. At the bottom or terminal end 212 of the fluid tube 211, there is secured thereto a plate 213 which is supported from the bottom of the tank 107 by such means as the spacer 214 and which is apertured centrally thereof for the passage of hydraulic fluid there through from the tube 211.

On the other hand when fluid is drawn from the tank 106 it is drawn through an appropriate central aperture in a plate 215 supported from the bottom of the tank 106 by such means as a spacer 216. Fluid flow through the aperture in the plate 215 will direct the fluid into a filter 217, if such a filter is desired, from which the fluid will flow to a fluid outlet supply tube 218 which is in fluid communication with the fluid passage 142 (Figure 3) leading to the pump 102. The fluid level in the tank assembly 100, 106 and 107 is usually maintained at a height above the top edge 219 of the tanks 106 and 107 so that fluid will flow from the tank 107 to the tank 106 during normal operation.

If the fluid returned to the tank 107 or the fluid drawn from the tank 106 flowed at a velocity equal to the flow rate through the tubes 211 and 218, there would be considerable agitation of the hydraulic fluid in the tanks with a result that a considerable quantity of air bubbles and the like would be mixed into the hydraulic fluid. The existence of such air bubbles is, of course, obviously highly objectionable and it is an important feature of tanks embodying the principles of the present invention to reduce the probability of agitation causing these air bubbles by means of controlling the velocity of hydraulic fluid flow entering the tanks and leaving the tanks. This control is effected in a tank assembly shown in Figure 11 by properly controlling the spacing between the plates 213 and 215 from the bottom of the tanks 107 and 106 respectively and by controlling the diameters of the plates 213 and 215 and the proportion of those diameters to the inside diameters of the tanks 107 and 106 respectively.

That is, by properly spacing the plate 213 from the bottom of the tank 107, the velocity of the fluid emitting from the end of the tube 211 may be reduced to one-fourth of that velocity for fluid flow between the plate 213 and the bottom of the tank 107. Then by controlling the spacing between the peripheral edge of the plate 213 from the inner cylindrical face of the tank 107, the velocity of fluid through the peripheral spacing may be reduced to one-fourth of the fluid velocity between the plate 213 and the bottom of the tank 107. Therefore, by controlling the size of plate 213 and of the spacing thereof from the bottom of the tank 107, the velocity of the fluid flow into the tank 107 may be reduced to a value of $\frac{1}{16}$ of the fluid flow velocity through the return tube 211. Such a reduced velocity will so reduce fluid agitation within the tank 107 that there will be substantially no bubbling and no mixture of air bubbles with the fluid. Actually, with a system of this invention, the fluid level will rise and fall very smoothly and evenly and with a very minimum of agitation.

Fluid flow from the supply tank 106 is effected in a very similar manner and by similar control of the size and spacing of the plate 215 with respect to the size of the tank 106 and the bottom thereof. With this construction fluid flow between the periphery of the plate 215 and the side walls of the tank 106 will be one-fourth of the fluid flow velocity between the plate 215 and the bottom of the tank 106, which in turn will have a velocity of only one-fourth of that through the tube 218 after the fluid passes through the filter 217.

Figure 12:
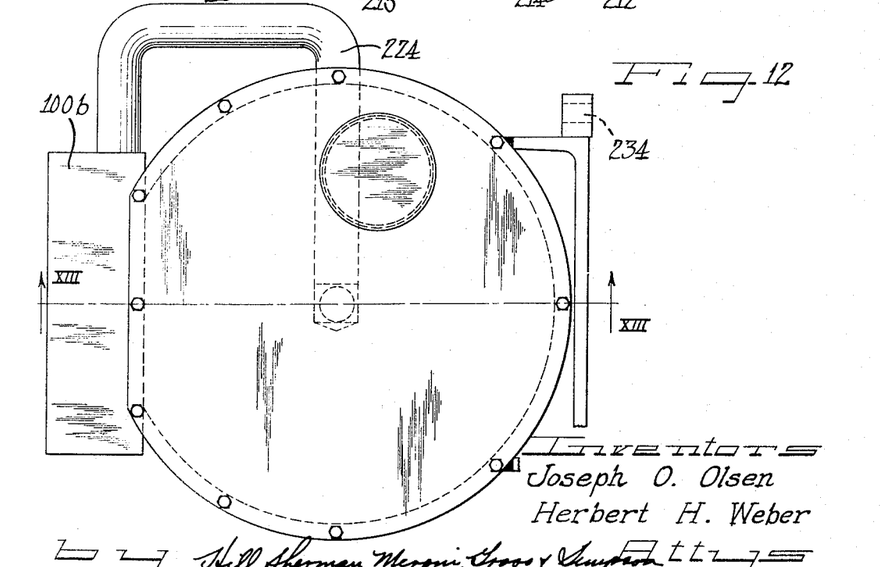
Figure 12 is a plan view of another form of tank assembly.
Figure 13:
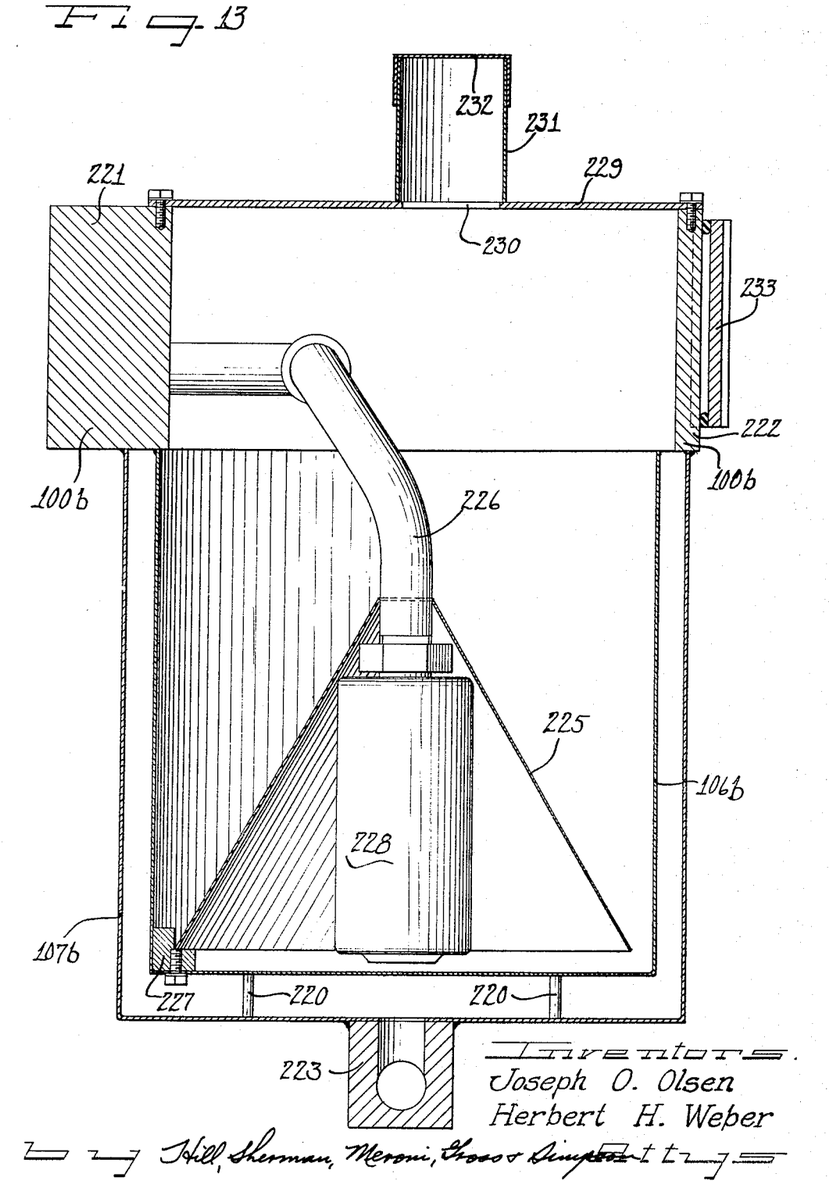
Figure 13 is a sectional view of the tank assembly of Figure 12 taken substantially along the line XIII—XIII of Figure 12.

Another tank structure embodying the principles of this invention is illustrated in Figures 12 and 13 wherein there is shown an assembly with a tank head 100b which supports concentric tanks or coaxially disposed tanks 107b and 106b.

The tanks are secured to the head 100b by any convenient means such as welding or the like and the tank 106b is arranged coaxially and within the tank 107b and supported from the bottom thereof by any convenient means such as stand off spacers 200 or the like.

The head 100b is actually formed with two distinct sections including the passage block 221 and a supporting ring 222 so that while both tanks have their upper edge secured to the block 221, only the outer tank 107b is secured to the ring 222. In this manner of construction there is fluid communication between the return tank 107b and supply tank 106b so that fluid entering into the tank 107b during the cutting stroke may be eventually resupplied into the system through the supply tank 106b, the fluid level usually being maintained above the upper edges of the tanks and within the region of the head 100b.

Return fluid from the system flows into the tank 107 through an entrance block 223 which is secured to the bottom of the tank 107 and apertured for fluid passage therethrough. The block 223 is actually in fluid communication with a return fluid tube 224 which enters the head 100b and is in fluid communication with the valve outlet passage 141.

Fluid velocity into the tank 107b is reduced to $\frac{1}{16}$ the flow velocity through the tube 224 since it is reduced one-quarter upon entering and flowing through the space between the bottom of the tank 106b and the bottom of the tank 107b and is further reduced to one-fourth of that reduced velocity when flowing between the sides of the tanks 106b and 107b. Fluid flow from the tank assembly and more particularly from the tank 106b is gradually increased in velocity as it flows over a fluid directing cone 225 which is inverted with its apex at the top thereof and supported on and concentric with the fluid supply outlet tube 226 leading through the head 100b to the valve inlet passage 142 (Figure 3). The base region of the cone 225 is supported on the stand off blocks such as the illustrated block 227 and has such a base diameter that fluid velocity over the base edge is about one-fourth as great as fluid velocity along the upper face of the bottom of the tank 106b.

Thus it will be observed that fluid flow from the tank 106b may be increased in controlled steps so that there will be a minimum of agitation of the fluid as the fluid is supplied into the system from the tanks. Also, fluid flow into the tanks from the fluid system will be at such a controlled velocity as to reduce agitations substantially to a minimum and thereby reduce possibility of air bubbling into the oil in the tank.

As herein above pointed out, the oil may be filtered in this arrangement and the tank assembly of Figures 12 and 13 may be provided with such a filter as the filter 228 at the base of the fluid supply tube 226 and within the fluid directing cone 225. Also, the top of the mounting head 100b may be covered by such means as a cap or plate 229 which is apertured as at 230 for filling the tank and which aperture is covered by a filling port 231 and cap 232.

To mount the tank assembly of Figures 12 and 13 into the automatic slicing mechanism and specifically on to the supporting plate 21, the tank head 100b may have secured thereto a mounting bracket 233 with appropriate apertures 234 therethrough for machine screws or bolts or the like to secure the same to the plate 21.

The tank assembly of Figures 12 and 13, in addition to having all of the approved features described above for the tank assembly illustrated in Figures 1 and 11, has the further advantage that it may smoothly and steadily supply and receive oil for the fluid system and may be of such size as to have an even smaller capacity than one half of the fluid volume capacity normally considered necessary for hydraulic systems requiring the fluid flow quantities which are required by fluid systems of this invention.

Thus there is provided in accordance with the principles of the present invention a slicing machine having an operational cycle such that automatic reciprocation is obtained during reciprocation of the blade or a live knife unit 41 and the meat or article supporting unit 60 as they are supported on the piston rods 31, 32 which reciprocate together with each other, and with the piston rods cooperatively supporting the meat during the slicing operation. This cooperation in supporting the meat is best understood from an examination of Figures 7 and 9, even though these figures show the meat-supporting units 60 in two different adjusted positions. As the knife unit 40 and the supporting unit 60 are moved rearwardly during the power or slicing stroke, the knife edge 42 cuts into the meat and therethrough with the knife edge 42 passing immediately under the lower edge 76 of the dead knife 73. At the end of the cutting or power stroke the meat is supported entirely on the blade face 44, and intermediate the beginning and the end of the cutting stroke the meat is supported partially by the support members 62 and the blade face 44 as illustrated in Figure 9.

In operating the machine, meat may be stacked on the table top 13 to be pushed or conveyed into the hopper 18 where it will drop through the opening 17 onto the supporting finger 62 of the supporting unit 60. Actuation of the machine commences the automatically reciprocating slicing operation and the slices taken from the meat drop to any convenient collecting means such as a conveyor or a cart or the like and the meat to be sliced continues to progress downwardly by gravity feed.

The slicing machine of the present invention is not only an efficient, compact and self-contained unit affording it maximum versatility, but also is constructed for easy and efficient maintenance. The hopper 18 may be readily removed by simply lifting the same from its position shown in Figures 1 and 2. The top 12 of the housing 10 may also be readily removed by a proper manipulation of the lock and key unit 85 which normally locks the top 12 to the reinforced frame and support 71.

The housing 10 is also provided with an electrical control compartment 210 which may be entered through the side of the housing.

Further, convenient tank draining spouts 127 are provided at the bottom of the tank 106 and 107 and convenient tank filling means 128 is provided at the top of the tank and a cover 129 may be placed thereon.

It will be evident from the foregoing that modifications and variations may be effected without departing from the scope and spirit of the novel concepts of the present invention and we, therefore, intend to cover all such variations and modifications.

We claim as our invention:

1. In combination in a slicing mechanism, means for adjusting the thickness of the slice to be taken from the article to be sliced, the slices to be taken to have either of two preselected thicknesses, comprising a laterally reversible supporting unit having an elongated U-shaped body member and a plurality of article-supporting fingers carried on the bight of said U-shaped body member, a groove in each end of said body member, said grooves lying in a common plane, said supporting fingers being disposed in a plane parallel with said common plane and displaced therefrom, a pair of separate carrying units disposed one at each end of said supporting unit, a lug on each of said carrying units fitted to said grooves, and means to removably secure said U-shaped supporting unit to said carrying units with said lugs in said grooves thereby permitting lateral reversal of said supporting unit on said carrying units whereby said supporting unit is disposed selectively higher and lower in the slicing mechanism.

2. A gravity-fed slicing machine comprising, in combination: a base having a hopper with an upwardly directed opening for receiving goods to be sliced, and a downwardly directed opening; a hydraulic system including a pair of hydraulic actuators each having a cylinder supported by said base, and each also having a reciprocable piston rod extending therefrom in a generally horizontal direction; said hopper being disposed between the piston rods of said actuators; a knife unit supported on said piston rods for horizontal reciprocation in a plane adjacent to said downwardly directed opening; and an article supporting structure supported on said piston rods laterally adjacent to said knife unit, and having a first upwardly directed goods-support surface which is disposed a distance below and reciprocable parallel to the plane in which said knife unit is reciprocable; said article supporting structure being invertable to provide an alternate goods-support surface disposed a different distance below said knife unit plane.

References Cited in the file of this patent

UNITED STATES PATENTS

| | | |
|---|---|---|
| 539,573 | Cartwright | May 21, 1895 |
| 958,121 | Hickerson | May 17, 1910 |
| 1,161,736 | Sayer | Nov. 23, 1915 |
| 1,247,336 | Saunders | Nov. 20, 1917 |
| 1,255,013 | Ireland | Jan. 29, 1918 |
| 1,849,782 | Balensiefer | Mar. 15, 1932 |
| 1,907,621 | Van Berkel | May 9, 1933 |
| 2,051,352 | Taylor | Aug. 18, 1936 |
| 2,278,713 | Riddle | Apr. 7, 1942 |
| 2,519,409 | Strassenburg | Aug. 22, 1950 |
| 2,586,906 | Beckett et al. | Feb. 26, 1952 |
| 2,592,832 | Strand | Apr. 15, 1952 |
| 2,631,608 | Rosenberg | Mar. 17, 1953 |
| 2,641,279 | Baldwin | June 9, 1953 |